United States Patent
Sharifzadeh et al.

(10) Patent No.: US 12,325,636 B2
(45) Date of Patent: Jun. 10, 2025

(54) REDUCED GRAPHENE OXIDE

(71) Applicant: Monash University, Clayton (AU)

(72) Inventors: Meysam Sharifzadeh, Clayton (AU); Mainak Majumder, Clayton (AU); Parama Chakraborty Banerjee, Clayton (AU); Mahdokht Shaibani, Clayton (AU); Dilusha Cooray, Clayton (AU)

(73) Assignee: Monash University (AU)

( * ) Notice: Subject to any disclaimer, the term of this patent is extended or adjusted under 35 U.S.C. 154(b) by 790 days.

(21) Appl. No.: 17/613,755

(22) PCT Filed: May 22, 2020

(86) PCT No.: PCT/AU2020/050507
§ 371 (c)(1),
(2) Date: Nov. 23, 2021

(87) PCT Pub. No.: WO2020/237289
PCT Pub. Date: Dec. 3, 2020

(65) Prior Publication Data
US 2022/0242735 A1    Aug. 4, 2022

(30) Foreign Application Priority Data
May 24, 2019 (AU) .............................. 2019901781

(51) Int. Cl.
*C01B 32/192* (2017.01)
*B82Y 30/00* (2011.01)
*B82Y 40/00* (2011.01)

(52) U.S. Cl.
CPC ............. *C01B 32/192* (2017.08); *B82Y 30/00* (2013.01); *B82Y 40/00* (2013.01); *C01B 2204/22* (2013.01)

(58) Field of Classification Search
CPC . C01B 32/192; C01B 2204/22; C01B 32/184; C01B 32/198; C01B 32/182;
(Continued)

(56) References Cited

FOREIGN PATENT DOCUMENTS

| CN | 103065813 A | 4/2013 |
|---|---|---|
| CN | 103754866 A | 4/2014 |

(Continued)

OTHER PUBLICATIONS

Das, et al., Iodide-mediated room temperature reduction of graphene oxide: a rapid chemical route for the synthesis of a bifunctional electrocatalyst, J. Mater. Chem. A. 2014; 2: 1332-1340 (Year: 2014).*

(Continued)

*Primary Examiner* — Daniel C. McCracken
(74) *Attorney, Agent, or Firm* — Polsinelli PC

(57) ABSTRACT

A method of reducing graphene oxide (GO), the method comprising the steps of: suspending GO and dissolving an iodide in a liquid medium, whereby the dissolved iodide partially reduces the GO to obtain a liquid composition comprising partially reduced GO (prGO) and dissolved iodide, removing liquid medium from the liquid composition to form a graphitic layer comprising prGO and iodide, and irradiating the graphitic layer with UV radiation to further reduce the prGO and provide for a reduced form of graphene oxide.

18 Claims, 11 Drawing Sheets

(58) Field of Classification Search
CPC ..... C01B 32/186; C01B 32/188; C01B 32/19; C01B 32/194; C01B 32/196; C01B 2204/00; C01B 2204/02; C01B 2204/04; C01B 2204/06; C01B 2204/065; C01B 2204/20; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B82Y 30/00; B82Y 40/00; H01G 11/36
See application file for complete search history.

(56) References Cited

FOREIGN PATENT DOCUMENTS

| | | |
|---|---|---|
| CN | 107610804 A | 1/2018 |
| CN | 201910220269.3 A | 7/2019 |
| KR | 20140119952 | 10/2014 |
| WO | 2018044762 A1 | 3/2018 |
| WO | 2018158761 A1 | 9/2018 |

OTHER PUBLICATIONS

Li, et al., Novel iodine-doped reduced graphene oxide anode for sodium ion batteries, RSC Adv. 2017; 7: 55060-55066 (Year: 2017).*
Nagar, et al., Design and Fabrication of Printed Paper-Based Hybrid Micro-Supercapacitor by using Graphene and Redox-Active Electrolyte, ChemSusChem 2018; 11: 1849-1856 (Year: 2018).*
Extended European Search Report, regarding PCT/AU2020/050507 dated Oct. 31, 2023, 10 pages.
Xue, Yuhua et al., "Multiscale patterning of graphene oxide and reduced graphene oxide for flexible supercapacitors," Carbon, vol. 92, Oct. 1, 2015, pp. 305-310.
Das, A.K., et al., Iodide-mediated room temperature reduction of graphene oxide: a rapid chemical route for the synthesis of a bifunctional electrocatalyst, Journal of Materials Chemistry A, 2014, vol. 2, pp. 1332-1340.
Li, J., et al., Novel iodine-doped reduced graphene oxide anode for sodium ion batteries, RSC Adv., 2017, vol. 7, pp. 55060-55066.
International Search Report, regarding PCT/AU2020/050507 dated Jul. 24, 2020, 4 pages.
Written Opinion of International Searching Authority, regarding PCT/AU2020/050507 dated Jul. 24, 2020, 8 pages.
Korean Application No. 10-2021-7042326, Office Action issued Feb. 14, 2025, 5 pages.

* cited by examiner

REDUCED GRAPHENE OXIDE

TECHNICAL FIELD

The invention relates to methods for the reduction of graphene oxide (GO), and in particular to methods for the provision of a reduced form of GO, and corresponding reduced form of GO.

BACKGROUND ART

Graphene oxide (GO) is an oxidized form of graphene, in which oxygen-containing groups are attached to graphitic basal planes forming the graphene structure. Relative to graphene, GO is a poor electrical conductor. However, the electrical conductivity characteristics of GO can be improved by reducing the GO to eliminate oxygen-containing groups from its structure. Reduction of GO may result in the restoration of π-conjugations, which results in enhancement of thermal and electrical conductivity properties. To date, there exist a number of available procedures for GO reduction, which typically involve the thermal, chemical, or photochemical reduction of GO.

Thermal reduction of GO requires exposure of GO to heat. While the procedure is simple, thermal reduction of GO also promotes unnecessary re-stacking of graphene sheets due to formation of strong π-π interactions within the structure of reduced GO. A number of strategies have been proposed in an attempt to prevent re-stacking, however the issue remains currently unresolved. In addition, the production of thermally reduced GO can pose an energy demand that is unlikely to be sustainable for the large-scale production of reduced GO.

Chemical reduction of GO involves exposing GO to solutions of strong reducing agents. In conventional procedures, such reducing agents may include $NaBH_4$, hydroiodic acid (HI), hydroquinone, sulphur compounds, hydrazine, and hydrazine derivatives. However, the toxic and potentially explosive nature of those agents inherently limit the chemical reduction of GO to small-scale and laboratory applications.

Both thermal and chemical reduction procedures are inherently unsuitable for the large-scale provision of reduced GO in dry form on substrates, which is essential for the implementation of reduced GO in functional devices. In that regard, the number of substrate materials that are compatible with the high temperature and/or reactive chemicals involved in conventional procedures is significantly limited.

Photochemical reduction involves the exposure of GO to radiation, and typically require the addition of a photocatalytic additive to the GO as photoelectron source and reduction aid, which facilitates radiation-induced elimination of the oxygen-containing groups. However, the additives tend to remain in the reduced GO as contaminants, significantly reducing its applicability in electric/electronic devices.

In short, existing procedures for the reduction of GO suffer from limitations related to their inherent energy demand, safety restrictions, and applicability and, as a result, are inevitably plagued by environmental issues, high cost, limited scalability, and inefficiency. There is therefore an opportunity for addressing or ameliorating one or more disadvantages or limitations of the prior art, or to at least provide a useful alternative.

SUMMARY OF THE INVENTION

The present invention provides a method of reducing graphene oxide (GO), the method comprising the steps of (i) suspending GO and dissolving an iodide in a liquid medium, whereby the dissolved iodide partially reduces the GO to obtain a liquid composition comprising partially reduced GO (prGO) and dissolved iodide, (ii) removing liquid medium from the liquid composition to form a graphitic layer comprising prGO and iodide, and (iii) irradiating the graphitic layer with UV radiation to further reduce the prGO and provide for a reduced form of graphene oxide.

The specific sequence of chemical reduction and photo-reduction steps in the method of the invention can provide efficient and highly controllable reduction of GO. Advantageously, the use of the iodide and UV radiation can avoid the need for noxious or toxic reagents, or harsh experimental conditions. As a result, the proposed method can advantageously be implemented in large-scale production of a reduced form of GO.

The use of iodide facilitates the overall reduction of GO during both step (i) and step (iii) of the present method. In the liquid medium, the dissolved iodide can promote the partial reduction of GO. During UV irradiation, presence of the iodide is believed to accelerate the reduction rate of the prGO yielding a reduced form of GO with higher conductivity relative to reduced GO obtained with conventional procedures.

The liquid composition comprising prGO and iodide are advantageously stable. In particular, the liquid composition does not show phase separation of the prGO for prolonged periods of time. As a result, the liquid composition can advantageously be stored for long periods of time with no need to be stabilised by dispersing agents such as surfactants. This is particularly advantageous when the liquid medium is water, in which prGO suspensions are generally unstable and tend to settle within a short time unless a surfactant is also mixed in the water.

In some embodiments, the GO and the iodide are provided in the liquid medium according to a GO:iodide weight ratio from about 1:2 to about 4:1. Those specific ratios advantageously allow to perform a partial reduction of GO while providing for a liquid composition of prGO and iodide that is particularly stable for prolonged periods without the assistance of added surfactants. In other words, the use of the iodide at those weight ratios provides for an advantageous compromise between reduction extent and reduced zeta potential of the suspension, resulting in improved stability.

In some embodiments, the method includes a step of depositing the liquid composition comprising prGO and dissolved iodide on a substrate prior to removing liquid medium from the liquid composition. The subsequent removal of the liquid medium from the liquid composition allows consolidating a graphitic layer comprising prGO and iodide on the substrate. Upon UV irradiation of the consolidated layer, the method of the invention therefore allows for the large-scale provision of graphitic layers of a reduced form of GO on a wide range of substrates for device use.

In some embodiments, the substrate is a current collector for an electrode. Accordingly, the method of the invention is particularly advantageous for the large-scale production of graphitic layers of a reduced form of GO for use in electrodes of a wide range of electric devices. The resulting electrode shows superior ion transport properties than conventional reduced GO-based electrodes, making it particularly suited for use in a supercapacitor.

Aspects of the present invention relate also to the reduced form of GO obtained by the method of the invention, as well as an electrode comprising the reduced form of graphene oxide obtained with the method of the invention.

The reduced form of graphene oxide obtained by the method described herein is believed to be unique in its own right.

Accordingly, the present invention also provides a graphitic material comprising sheets of a reduced form of graphene oxide intercalated with iodide.

In some aspects, the invention also relates to an electrode comprising such graphitic material, and to a supercapacitor comprising said electrode.

By having sheets of a reduced form of GO intercalated with iodide, the graphitic material advantageously presents superior ion transport properties relative to conventional reduced GO, making the material particularly suited for use in an electrode. In addition, supercapacitors made of those electrodes advantageously possess larger gravimetric capacitance and significantly improved rating capability than supercapacitors made of conventional reduced GO. The specific structure of the composite facilitates the provision of low equivalent series resistance (ESR) in the device, leading to excellent super-capacitive performance and rating capability.

Further aspects and embodiments of the invention are described in more detail below.

BRIEF DESCRIPTION OF THE DRAWINGS

Embodiments will be now described with reference to the following non-limiting drawings, in which.

DETAILED DESCRIPTION OF THE INVENTION

Figure 1:
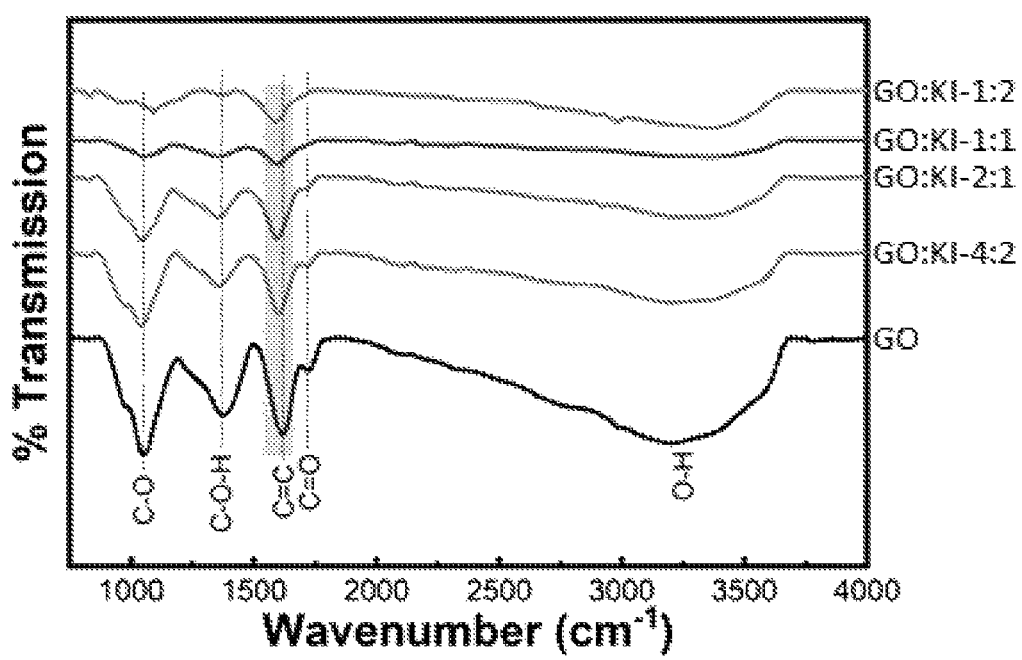
FIG. 1 shows Fourier-transform infrared (FTIR) spectra of a partially reduced GO/KI graphitic layer obtained by drop-casting on a glass slide a water suspension of partially reduced GO and KI, followed by drying.

The present invention provides a method of reducing graphene oxide (GO).

As used herein, the expression "graphene oxide" (or "GO") refers to a compound of carbon, oxygen and hydrogen obtained by oxidizing graphite, in which oxygen-containing groups are attached to the basal plane of stacked graphene sheets.

In this context, the term "graphene" is used to indicate an allotrope of carbon having a one-atom thick planar sheet structure of typically $sp^2$-bonded carbon atoms that are densely packed in a honeycomb two-dimensional crystal lattice. The covalently bonded carbon atoms typically form repeating units that comprise 6-membered rings, but can also form 5-membered rings and/or 7-membered rings. A layer of such covalently bonded carbon atoms is commonly referred to as a graphene "sheet".

By its own chemical nature, graphene has a very stable structure, high conductivity, high toughness, high strength, and a large specific surface area which can be desirable properties for the electrode material in supercapacitors. However, making electrodes directly from graphene has challenges or limitations. Despite the large surface areas, supercapacitors formed using a monolayer of graphene may have limited volume capacitance. Also, although stacks of graphene sheets may achieve high volume capacitance, the surface may be poorly accessible to ions due to the small spaces between sheets. In addition, aqueous graphene suspensions (i.e. graphene "inks") are not stable unless they are stabilised by a surfactant, which can act as contaminant thereby affecting the conductivity of the resulting graphene-based electrodes. Similarly, organic-based Graphene inks are typically stabilised by surfactants and provided as suspensions in hazardous solvents such as toluene, N-Methyl-2-pyrrolidone (NMP), etc. Furthermore, conventional methods of producing graphene often consume a large amount of energy and involve high costs, thus do not suit mass production.

Accordingly, for practical purposes it is preferable to produce conductive layers having graphene-like structure by reducing GO rather than forming electrodes directly from native graphene. GO is easy to process since it readily suspends in polar solvents (e.g. water), providing for relatively stable inks which can be used in a variety of deposition techniques, including die casting, tape casting, etc. In addition, reducing GO allows to provide an electrically conductive graphene-like structure which has conductivity characteristics that is not affected by the limited volume capacitance which limits the direct applicability of native graphene.

From the structural standpoint, planar sheets of typically $sp^2$-bonded carbon atoms densely packed in a honeycomb two-dimensional crystal lattice is referred herein as "graphitic" structure. It will therefore be understood that graphene, GO, and all forms of reduced GO, including partially reduced GO, share a "graphitic" structure.

GO is an electrically insulating graphitic material composed of one or more graphene carbon sheet(s) with oxygen-containing functional groups bonded perpendicular to the graphene basal-plane. As used herein, the expression "oxygen-containing functional group" indicates functional groups such as epoxide, carbonyl, hydroxyl, and phenol, which are covalently bound to a carbon atom of a graphene oxide sheet. Typically, such oxygen containing functional groups result of oxidation reactions performed on graphite.

Typical FTIR spectra of GO displays the presence of peaks associated to C—O, C—OH, C═C, C═O in carboxylic acid and carbonyl moieties, which can be detected mostly along sheet edges but also on the basal plane of graphene sheets, as well as a broad O—H peak. The oxygen content of GO may be determined by suitable techniques. For example, oxygen content and hence oxidation degree of GO may be determined by X-ray photoelectron spectroscopy (XPS), which measures the type and percentage of each type of chemical element present in a material. Typically, GO would have a carbon to oxygen (C:O) ratio as determined by XPS in a range of from about 2:1 to about 4:1, preferably from about 2.5:1 to 3:1.

Suitable GO for use in the invention may be obtained by any means known to the skilled person. For example, the GO may be obtained by performing oxidation reactions on graphite. An example of an available procedure in that regard is known as modified Hummer's method, which involves chemical oxidation of graphite powder by sequential exposure of the graphite to strong oxidizing agents such as $H_2SO_4$, $KMnO_4$, $H_2O_2$, and HCl. A detailed description of those procedures may be found in Hummers, W. S. et al., "Preparation of Graphitic Oxide", *J. Am. Chem. Soc.* 1958, Volume 80, page 1339, and Stankovich, S. et al., "Synthesis of Graphene-Based Nanosheets via Chemical Reduction of Exfoliated Graphite Oxide" *Carbon* 2007, Volume 45, pages 1558-1565, the contents of which are incorporated herein in their entirety.

The GO may be provided in any form, as long as it can be reduced. In some embodiments, the GO is provided in the form of multi-sheet GO. In that form, the graphitic basal planes of the GO are stacked in a multi-sheet arrangement. In other embodiments, the GO is provided in the form of single sheet (or monolayer) GO. In that arrangement, the graphitic basal planes of the GO are provided as single discrete sheets.

The method of the invention comprises a step of suspending GO and dissolving an iodide in a liquid medium.

By "suspending" GO in a liquid medium is meant that GO is provided in the liquid medium as a dispersed phase. That is, suspended GO in the liquid medium does not visibly settle or float in the liquid medium. By "iodide" is meant a compound with iodine in formal oxidation state—1, typically provided in salt form. Accordingly, by "dissolving" an iodide in the liquid medium, the iodide is solubilised in the medium in its ionic form.

In this context, the liquid medium may be any medium in which GO can be suspended and the iodide dissolved. Typically, the liquid medium would be sufficiently polar to ensure homogeneous suspension of the GO and dissolution of iodide. For example, the liquid medium may comprise water in an amount of at least about 50% by weight, relative to the total weight of the liquid medium. In some embodiments, the liquid medium comprises water in an amount of from 50% to 100% by weight, from 75% to 100% by weight, or from 90% to 100% by weight relative to the total weight of the liquid medium. In some embodiments, the liquid medium is water.

The GO may be suspended and the iodide dissolved in the liquid medium according to any procedure that would be known to a skilled person. For example, the GO may be suspended in the liquid medium in the form of particles or flakes, and combined with the iodide by the iodide being dissolved in the medium. This may be achieved in any way that is conducive to the combination of the two components.

In some embodiments, the GO is first suspended in the liquid medium and the iodide is subsequently dissolved in the suspension. In some alternative embodiments, the iodide is first dissolved in the liquid medium to form an iodide solution, and the GO subsequently suspended in the iodide solution. In some further alternative embodiments, the GO and the iodide are suspended/dissolved in two discrete aliquots of the liquid medium, and the two aliquots are subsequently combined.

The GO may be suspended in the liquid medium in any amount, provided GO is suspended in the liquid medium with no visible settling or floating in the medium. In some embodiments, the GO is suspended in the liquid medium according to a concentration of at least 0.1 g/l. For example, the GO may be suspended in the liquid medium according to a concentration of at least about 1 g/l, at least about 10 g/l, at least about 20 g/l, at least about 50 g/l, at least about 100 g/l, or at least about 500 g/l. In some embodiments, the GO is suspended in the liquid medium according to a concentration of from about 0.1 g/l to about 500 g/l, from about 1 g/l to about 500 g/l, from about 10 g/l to about 100 g/l, or from about 10 g/l to about 50 g/l. For example, the GO may be suspended in the liquid medium according to a concentration of about 20 g/l.

In addition, the iodide may be used in any amount relative to the suspended GO that ensures dissolution of iodide in the medium and partial reduction of the GO. For example, the GO and the iodide may be provided in the liquid medium according to a GO:iodide weight ratio from about 1:50 to about 50:1, for example from about 1:25 to about 25:1, from about 10:1 to about 1:10, or from about 5:1 to about 1:5.

In some embodiments, the GO and the iodide are provided in the liquid medium according to a GO:iodide weight ratio from about 1:2 to about 4:1, for example from about 2:1 to about 4:1. In particular, the GO and the iodide may be provided in the liquid medium according to a GO:iodide weight ratio of about 2:1 or about 4:1. In some embodiments, the GO and the iodide are provided in the liquid medium according to a GO:iodide weight ratio of about 1:2. The specific ratios of those embodiments advantageously allow to perform a partial reduction of GO while providing for a GO/iodide suspension that is particularly stable for prolonged periods without the assistance of added surfactants. In particular, it was observed that the weight ratios in these embodiments provide for slight reduction of GO while reducing zeta potential of the suspension, resulting in an improved stability as shown by data described in the Examples, and in particular Example 3.

The iodide may be any iodide compound that can chemically reduce GO. In some embodiments, the iodide is a metal salt of the anion $I^-$. Suitable examples of such salts include alkali metal iodides. Accordingly, in some embodiments the iodide is an alkali metal iodide, for example an alkali metal iodide selected from lithium iodide, potassium iodide, sodium iodide, and a combination thereof.

By suspending the GO and dissolving the iodide in the liquid medium, the GO and the iodide are combined resulting in the iodide partially reducing the GO. By the iodide "partially" reducing GO (and by the GO being "partially" reduced by the iodide) is meant that the iodide acts to eliminate a fraction of the oxygen-containing functional groups of the GO. In other words, the mere combination of the GO and the iodide does not induce complete deoxidation of the GO. Accordingly, the iodide may partially reduce the GO by eliminating less than about 100%, less than about 75%, less than about 50%, or less than about 25% of the oxygen-containing functional groups of the GO.

The majority of the oxygen-containing functional groups in GO are hydroxyl and epoxy groups. As such, determinant to the effective partial reduction of GO is the removal of hydroxyl and epoxy groups from the GO structure. Without wanting to be limited by theory, it is believed that iodide ions in solution can catalyse epoxide ring opening reactions, resulting in the formation of hydroxyl groups. In turn, the hydroxyl groups are then believed to undergo dehydration to the corresponding olefins, thereby leaving the graphitic basal planes of the GO. It is also not excluded that iodide ions may directly substitute hydroxyl groups directly linked to carbon forming the GO structure.

In particular, it is believed that the iodide ion may act as a good nucleophile and attacks the carbon atoms attached to both hydroxyl and epoxy groups. Additional iodide ions may then attack the positively charged iodine atoms of C—I bond of GO, thus acting as a good leaving group and reducing the $sp^3$ to $sp^2$ carbon atoms. In short, it is believed that reduction of GO promoted by dissolved iodides may proceed according to a three-step mechanism, namely (a) epoxide ring opening giving rise to hydroxyl groups, (b) hydroxyl group substitution by iodide ions, and (c) elimination of iodine atoms resulting in reduced GO.

Raman spectroscopy may be used to assess the extent to which GO is partially reduced by the iodide. This may be done having regard to the ratio between the intensity of the G band ($I_G$) and D band ($I_D$) of the GO Raman spectra at wavenumbers of about 1600 $cm^{-1}$ and about 1350 $cm^{-1}$, respectively. While the G band cantered around 1600 $cm^{-1}$ can be associated to the bond stretching of all pairs of $sp^2$ atoms in carbon rings and chains typical of a graphene-like arrangement, the D band at about 1350 $cm^{-1}$ arises from the breathing modes of $sp^2$ atoms in carbon rings associated with presence of defects which include, inter alia, oxygen-containing functional groups.

In that regard, the iodide may be said to "partially" reduce the GO if the Raman $I_D/I_G$ ratio of the GO decreases of less than 50%, less than 25%, less than 10%, or less than 5%, relative to the $I_D/I_G$ ratio of the pristine GO (i.e. before being in contact with the dissolved iodide). The decrease in the $I_D/I_G$ ratio can be attributed to the removal of oxygen-containing functional groups and restoration of C=C bonds of the graphene-like honeycomb structure. Accordingly, in some embodiments the method comprises a step of suspending GO and dissolving an iodide in a liquid medium, in which the iodide partially reduces the GO such that the $I_D/I_G$ ratio of the GO decreases less than 25%, for example less than 10%, relative to the $I_D/I_G$ ratio of the pristine GO.

The iodide may be allowed to partially reduce the GO for a reaction time that is effective to ensure partial reduction of the GO. While it is believed that the iodide effectively partially reduces the GO within seconds of the two components being in contact, the liquid composition may be stirred for any duration that is compatible with the practical application of the procedure. For example, the liquid composition may be stirred for between about 10 seconds to about 24 hours. In some embodiments, the liquid composition is stirred for between about 30 minutes and 6 hours.

The method also comprises a step of removing liquid medium to form a graphitic layer comprising partially reduced GO (prGO) and iodide.

Removal of the liquid medium may be performed by any means known to a skilled person. For example, removal of the liquid medium may be achieved by thermal evaporation. By the liquid medium being "removed", is meant that at least 75% of the liquid medium is eliminated. In some embodiments, removing the liquid medium results in the elimination of at least 80%, at least 90%, or about 100% of liquid medium.

Removal of the liquid medium results in the formation of a graphitic layer comprising prGO and iodide. By a "graphitic layer" is meant a layer of material having graphitic structure. The "graphitic" nature of the layer derives by prGO being present in the layer, which has an inherent graphitic structure. In this context, the expression is used to indicate any consolidated mass comprising prGO and iodide resulting from the removal of the liquid medium. Such consolidated mass would present in solid-like form and as a three-dimensional structure made of prGO graphitic sheets and iodide, the latter being typically present as crystalline iodide intercalated within the sheets. Such structure would have discrete thickness, length and width dimensions.

In some embodiments, the method comprises a step of depositing the liquid composition comprising prGO and dissolved iodide on a substrate prior to removing the liquid medium. The deposition maybe performed according to any means known to the skilled person, provided that upon removal of the liquid medium a graphitic layer comprising prGO and iodide forms on a surface of the substrate. In some embodiments, depositing the liquid composition on substrate comprises drop casting, spin-coating, dip-coating, spray coating, ink-jet printing, gravure printing, screen printing, rod coating, tape casting, or slot die casting the liquid composition on a surface of the substrate. Formation of the graphitic layer comprising prGO and iodide is then achieved by removal of the liquid medium as described herein.

By depositing the liquid composition on a substrate followed by removal of the liquid medium it is possible to provide a thin graphitic layer comprising prGO and iodide on the substrate. By the graphitic layer being "thin" is meant that the layer has a thickness that is considerably smaller than both of its length and width dimensions so as to provide for conventional film-like dimension characteristics. The layer that forms on the substrate may therefore have any thickness that is compatible with the structural integrity of the layer. For example, the layer may have a thickness of at least about 10 nm, at least about 50 nm, at least about 100 nm, at least about 500 nm, at least about 1 μm, at least about 10 μm, or at least about 100 μm. In some embodiments, the layer has a thickness in a range of from about 10 nm to about 10 μm.

The substrate onto which the liquid composition is deposited may be any substrate compatible with the liquid composition. In that regard, there is no particular limitation on the type of the surface of the substrate that is contacted with the liquid composition. For example, the surface may form part of a substrate made from metal, glass, ceramic, composite material, paper, polymer, fabric, or a combination thereof. The surface may be flat, curved, undulating or may have a defined shape that is intended to be imparted upon the graphitic layer that results from the removal of the liquid medium. In that way, the surface of the substrate can effectively act as a mould to impart features of shape and configuration upon the resulting graphitic layer.

In some instances, the substrate may be an electrode component, for example a current collector. As a skilled person would know, a "current collector" is an electrically conductive component which facilitates the flow of electrons to and from an electrical device, for example a supercapacitor, connected to an external electric circuit. A suitable current collector may comprise a metal structure such as a metal foil or a metal grid. Typically, current collectors present in the form of sheets or thin layers, and may be made of any material suitable to conduct electricity.

In some embodiments, the substrate is a current collector made of an electrically conductive material selected from nickel, aluminium, steel, copper, gold, silver, and the like. In some embodiments, the current collector is a transparent current collector. For example, the current collector may be made of a transparent conductive polymer or a transparent ceramic conductor. In some embodiments, the current collector is made of a transparent conductive polymer selected from poly(3,4-ethylenedioxythiophene) (PEDOT), poly(3,4-ethylenedioxythiophene)—poly(styrene sulfonate) (PEDOT-PSS) copolymer, poly(4,4-dioctyl cyclopentadithiophene), poly(3-hexylthiophene) (P3HT), and a combination thereof. In some embodiments, the current collector is made of a transparent ceramic conductor selected from indium tin oxide (no), fluorine doped tin oxide (FTO), lanthanum strontium manganite (LSMO), aluminium doped zinc oxide (AZO), and a combination thereof. In some embodiments, the current collector is made of conductive carbon paper, carbon cloth, carbon felt, or a layer of carbon nanotubes (CNT).

The method of the invention also comprises a step of irradiating the graphitic layer comprising prGO and iodide with UV radiation to further reduce the prGO and provide for a reduced form of graphene oxide.

Irradiation of the layer comprising prGO and iodide with UV radiation may be performed by any means known to a skilled person. Typically, the step involves exposing the layer to UV radiation emanating from a suitable UV radiation source.

Without wanting to be limited by theory, it is believed that UV irradiation of the layer can promote photo-chemical reduction of residual oxygen-containing functional groups present in the prGO. In particular, during UV exposure the layer is irradiated with photons having higher energy than the energy boundary characteristic of the chemical bonds between the oxygen-containing functional groups and the graphitic basal-plane of the prGO. This can result in the removal of oxygen-containing functional groups from the prGO and recovery of additional aromatic double-bonded carbon.

Accordingly, by "UV radiation" is meant herein radiation at a wavelength within the UV range (i.e. 10 nm to 400 nm) that is suitable to further reduce the prGO. Raman spectroscopy can be used to assess whether the prGO "further reduces" upon being irradiated with UV radiation. This may be done having regard to the ratio between the intensity of the G band ($I_G$) and D band ($I_D$) of the prGO Raman spectra at wavenumbers of about 1600 cm$^{-1}$ and about 1350 cm$^{-1}$, respectively. As explained herein, the G band cantered around 1600 cm$^{-1}$ can be associated to the bond stretching of all pairs of sp$^2$ atoms in carbon rings and chains typical of a graphene-like arrangement, and the D band at about 1350 cm$^{-1}$ arises from the breathing modes of sp$^2$ atoms in carbon rings associated with presence of defects which include, inter alia, oxygen-containing functional groups.

In that regard, irradiating the layer with UV radiation may be said to "further reduce" the prGO if the Raman $I_D/I_G$ ratio of the irradiated layer decreases relative to the $I_D/I_G$ ratio of the layer before irradiation. For example, irradiating the layer with UV radiation may result in the Raman $I_D/I_G$ ratio of the irradiated layer to decrease at least about 1%, at least about 5%, at least about 25%, at least about 50%, at least about 75%, or about 100% relative to the $I_D/I_G$ ratio of the layer before irradiation. The decrease in the $I_D/I_G$ ratio can be attributed to the further removal of oxygen-containing functional groups and restoration of C=C bonds of the graphene-like honeycomb structure.

Accordingly, in some embodiments the step of irradiating the layer comprising prGO and iodide results in the prGO further reducing such that the $I_D/I_G$ ratio of the irradiated layer decreases between about 1% to about 10% relative to the $I_D/I_G$ ratio of the layer before being irradiated.

Parameters such as the wavelength of the UV radiation, the intensity of the UV radiation, and irradiation time can influence the extent to which the prGO further reduces.

UV irradiation may be performed at any UV wavelength that promotes further reduction of the prGO. In some embodiments, the UV radiation comprises a wavelength in the UVC range. By "UVC range" is meant one or more wavelengths in the range of from about 100 nm to about 280 nm.

In some embodiments, the UV radiation is monochromatic UV radiation, at a wavelength in the UVC range. For example, the UV radiation may be monochromatic UV radiation at a wavelength of about 254 nm. By the UV radiation being "monochromatic" at a specific wavelength is meant that the radiation intensity peaks at that wavelength, allowing for less than 10% intensity distribution around the peak value.

Suitable degrees of further reduction of the prGO can be selected, for example, based on the radiative energy that is characteristics of the UV source. In that regard, the UV source can be selected to provide radiant flux (power) at the layer unit surface that is sufficient to promote further reduction of the prGO. Such radiant flux may be expressed as "irradiance", and measured in milli-Watts per square centimetre (mW/cm$^2$). In some embodiments, the UV radiation has an intensity of from about 1 to about 100 mW/cm$^2$. For example, the UV radiation may have an intensity of from about 10 to about 50 mW/cm$^2$. In some embodiments, the UV radiation has an intensity of about 20 to 25 mW/cm$^2$.

UV irradiation may be performed for a time that is sufficient to promote further reduction of the prGO. For example, the layer comprising prGO and iodide may be irradiated for an irradiation time of from about 10 minutes to about 24 hours, for example from about 2 hours to about 17 hours.

The step of irradiating the layer with UV radiation may be performed according to any set-up known to a skilled person. For example, the layer may be positioned within a chamber that can be sealed from external radiation sources, and is provided with a UV source as the sole radiation source within the chamber. The inner walls of the chamber may themselves be made to reflect UV radiation to ensure homogenous distribution of UV radiation within the chamber. During the irradiation, the layer comprising prGO and iodide may be positioned at any distance from the UV source that is conducive to prGO further reducing. For example, the layer may be positioned at a distance of from about 1 cm to about 25 cm of the UV source. In one embodiment, irradiation of the layer comprising prGO and iodide is performed in a substantially oxygen-free environment, such in a vacuum or in an inert atmosphere such as a nitrogen or argon atmosphere.

The method of the invention provides for a reduced form of GO. Due to the specific nature of the method steps, a "reduced form" of GO will be understood to encompass GO that has been reduced to any extent of reduction between that of the prGO in the liquid composition and that of fully reduced GO. Accordingly, in some embodiments the reduced form of GO comprises fully reduced GO. The extent of reduction in the reduced form of GO can be quantified based on the intensity ratio ($I_D/I_G$) between the D and G band characterising the Raman spectrum of a given sample relative to the corresponding unreduced GO. Specifically, as used herein the expression "reduced form" of GO indicates a graphitic material characterised by an intensity ratio $I_D/I_G$ that is at least 5% less than the intensity ratio $I_D/I_G$ of the corresponding unreduced GO.

The invention therefore also relates to a reduced form of GO obtained in accordance with the method described herein.

It is believed that the reduced form of GO described herein is unique in its own right. Accordingly, the present invention also relates to a graphitic material comprising sheets of a reduced form of graphene oxide (GO) intercalated with iodide. The iodide may be present in any form of iodide described herein. For example, the iodide may be an alkali metal iodide of the kind described herein.

The sheets of the reduced form of GO may be characterised by any packing density that is compatible with the structural integrity of the material and having intercalated iodide. Generally, the packing density of the sheets of the reduced form of GO will range from about 0.05 to about 10 g/cm³. In some embodiments, the graphitic material comprises from about 0.1 µg/cm² to about 50 mg/cm² of sheets of the reduced form of GO, or from about 10 µg/cm² to about 50 mg/cm², or from about 100 µg/cm² to about 50 mg/cm², or from about 1 mg/cm² to about 50 mg/cm², or from about 1 mg/cm² to about 10 mg/cm², or about 7 mg/cm² of sheets of the reduced form of GO.

By the sheets of a reduced form of GO being "intercalated" with iodide is meant that iodide is spatially located between at least two adjacent graphitic sheets of the reduced form of GO. Provided it intercalates at least two sheets, the iodide may be provided in any form. For example, the sheets of the reduced form of GO may be intercalated with iodide in its ionic form, or iodide in its salt form. In some embodiments, the iodide intercalates the sheets of the partially reduced GO in its crystalline salt form.

The sheets of the reduced form of GO may be intercalated with any amount of iodide that would be compatible with the structural integrity of the resulting graphitic material. For example, the graphitic material may comprise at least about 5 wt %, at least about 10 wt %, at least about 25 wt %, at least about 50 wt %, or at least about 75 wt % of iodide relative to the total weight of the material.

From the functional standpoint, the specific structure of the graphitic material makes it a good candidate for use as electrode material in a supercapacitor. In that regard, presence of intercalated iodide can greatly reduce the resistance of the resulting electrode and enhance its rating capability.

The graphitic material described herein can therefore find useful application as electrode material for a variety of electrical devices, and in particular energy storage devices such as supercapacitors.

Accordingly, the invention also relates to an electrode comprising the graphitic material of the kind described herein, as well as to a supercapacitor comprising said electrode. As explained herein, the electrode can be obtained, for example, by providing the reduced form of GO on a suitable current collector.

The term "supercapacitor" is used herein to mean an electrical energy storage device that can store energy in part or in whole as double-layers of electrical charges, where one layer is composed of a charged electrode material and the other a layer of ions from an adjacent electrolyte. Typically, supercapacitors possess specific energy densities greater than 0.05 Wh/kg and are capable of delivering specific power densities in excess of 10 W/kg.

Supercapacitors have attracted intense attention due to their higher power density and longer lifecycle over rechargeable batteries. As such, supercapacitors may represent a valid alternative to conventional rechargeable batteries for applications requiring rapid power delivery and recharging, such as regenerative braking, short-term energy storage, hybrid electric vehicles, large industrial equipment, and portable devices.

In its most basic configuration, a supercapacitor comprises an electrode functioning as a cathode, an electrode functioning as an anode, an ion-permeable separator interposed between the electrodes, and an electrolyte interposed between, and in contact with, the electrodes. The combined function of the separator and the electrolyte ensures electrical insulation between the electrodes while allowing ions to diffuse to and from each electrode. As a result, electrons can only flow between the electrodes and an external electric load (circuit) connected to the electrodes. The electrode functioning as a "cathode", or "positive electrode", is the electrode at which electrons enter the supercapacitor during discharge. Conversely, the electrode functioning as an "anode", or "negative electrode", is the electrode at which electrons leave the supercapacitor during discharge.

Advantageously, an electrode comprising the reduced form of GO described herein can function as both negative and positive electrode. As such, a supercapacitor comprising an electrode of the kind described herein may be a hybrid or symmetric supercapacitor. A hybrid supercapacitor would have one electrode of the kind described herein, while a symmetric supercapacitor would have two identical electrodes being of the kind described herein.

In some embodiments, the supercapacitor is a symmetric supercapacitor having a sandwich structure. In this configuration, the supercapacitor comprises two identical electrodes and a separator sandwiched between the electrodes. Such supercapacitor may be fabricated according to any procedure known to the skilled person. Typically, the supercapacitor would be fabricated by (i) providing electrodes having a layer of a reduced form of GO of the kind described herein formed on a suitable current collector, and (ii) assembling the electrodes in the sandwich structure by interposing a suitable electrolyte and separator.

As used herein, an "electrolyte" means a substance that is electronically insulating but ionically conductive. Suitable electrolytes would be known to a skilled person. Typically, the electrolyte would contain mobile ions and be in intimate contact with the electrodes, thereby providing a separate and isolated pathway to ions relative to electrons. Typically, the requirements for a good electrolyte include a wide voltage window, high electrochemical stability, high ionic concentration and low solvated ionic radius, low resistivity, low viscosity, low volatility, low toxicity, low cost, and availability at high purity.

Examples of suitable electrolyte include electrolyte solutions obtained by combining a metal salt and a solvent. By "metal salt" is meant a compound made up of a metal ion (cation) and a counter anion, which can provide for metal ions when in solution. In that regard, by the expression "counter anion" is meant a negatively charged ion that is associated with the cation to provide for charge neutrality of the resulting lithium salt.

Provided the requirements of the invention are met, there is no particular limitation on the type of counter anion that can be used. Examples of suitable counter anions include $BF_4^-$, $PF_6^-$, $N(CN)_2^-$, $(CF_3SO_2)_2N^-$, $(FSO_2)_2N^-$, $OCN^-$, $SCN^-$, dicyanomethanide, carbamoyl cyano(nitroso)methanide, $(C_2F_5SO_2)_2N^-$, $(CF_3SO_2)_3C^-$, $C(CN)_3^-$, $B(CN)_4^-$, $(C_2F_5)_3PF_3^-$, alkyl-$SO_3^-$, perfluoroalkyl-$SO_3^-$, aryl-$SO_3^-$, $I^-$, $H_2PO_4^-$, $HPO_4^{2-}$, sulfate, sulphite, nitrate, trifluoromethanesulfonate, p-toluenesulfonate, bis(oxalate)borate, acetate, formate, gallate, glycolate, $BF_3(CN)^-$, $BF_2(CN)_2^-$, $BF(CN)_3^-$, $BF_3(R)^-$, $BF_2(R)_2^-$, $BF(R)_3^-$ where R is an alkyl group (for example methyl, ethyl, propyl), cyclic sulfonyl amides, bis(salicylate)borate, perfluoroalkyltrifluoroborate, chloride, bromide, and transition metal complex anions (for example [Tb(hexafluoroacetylacetonate)$_4$]).

The cation may be lithium ion. Thus, in some embodiments the electrolyte is a solution of a salt selected from a lithium salt, a sodium salt, a potassium salt, and a combination thereof.

Examples of suitable lithium salts include $Li_2SO_4$, $Li[PF_2(C_2O_4)_2]$, $Li[SO_3CF_3]$, $Li[N(CF_3SO_2)_2]$, $Li[C(CF_3SO_2)_3]$, $Li[N(SO_2C_2F_5)_2]$, $LiClO_4$, $LiPF_6$, $LiAsF_6$, $LiBF_4$, $LiB(C_6F_5)_4$, $LiB(C_6H_5)_4$, $Li[B(C_2O_4)_2]$, $Li[BF_2(C_2O_4)]$, or a mixture of any two or more thereof. In some embodiments, the electrolyte is a $Li_2SO_4$ electrolyte.

Examples of suitable sodium salts include $Na_2SO_4$, $NaClO_4$, $NaBF_4$, $NaPF_6$, sodium bis(fluorosulfonyl)imide (NaTFSI), sodium bis(fluorosulfonyl)imide (NaFSI), sodium bis(oxalato)borate (NaBOB), NaSCN, $NaSbF_6$, $NaAsF_6$, $NaAlCl_4$, $NaSiF_6$, $NaSO_3$, $CF_3$, and a mixture thereof.

Examples of suitable potassium salts include $K_2SO_4$, $KClO_4$, $KBF_4$, $KPF_6$, potassium bis(trifluoromethanesulfonyl)imide (KTFSI), potassium bis(fluorosulfonyl)imide (KFSI), potassium bis(oxalato)borate (KBOB), KSCN, $KSbF_6$, $KAsF_6$, $KAlCl_4$, $KSiF_6$, $KSO_3$ $CF_3$, and a mixtures thereof.

The solvent used to obtain the electrolyte may be any solvent capable to dissolve the metal salt. Depending on the salt, the solvent for use in the electrolyte may therefore be an organic or inorganic solvent. Examples of suitable inorganic electrolyte solvents include $SO_2$, $SOCl_2$, $SO_2Cl_2$, and the like, and mixtures of any two or more thereof. Examples of suitable organic electrolyte solvents include dimethyl carbonate (DMC), ethyl methyl carbonate (EMC), diethyl carbonate (DEC), methyl propyl carbonate (MPC), ethyl propyl carbonate (EPC), ethylene carbonate (EC), propylene carbonate (PC), dipropyl carbonate (DPC), bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, methyl propionate, butyl propionate, ethyl propionate, sulfolane, 1,2-dimethoxyethane, 1,2-diethoxyethane, tetrahydrofuran, 1,3-dioxolane, 4-methyl-1,3-dioxolane dimethoxyethane, triglyme, dimethylvinylene carbonate, tetraethyleneglycol, dimethyl ether, polyethylene glycols, sulfones, and gamma-butyrolactone (GBL), vinylene carbonate, chloroethylene carbonate, methyl butyrate, ethyl butyrate, ethyl acetate, gamma-valerolactone, ethyl valerate, 2-methyl-tetrahydrofuran, 3-methyl-2-oxazolidinone, 1,3-dioxolane, 4-methyl-1,3-dioxolane, vinylethylene carbonate, 2-methyl-1,3-dioxolane, acetonitrile (ACN) and mixtures of any two or more thereof. In some embodiments, the solvent is water.

The electrolyte may contain any amount of metal ion conducive to the supercapacitor being fit for purpose. For example, the electrolyte may contain metal ions at a concentration of at least about 1 mol %, at least about 10 mol %, at least about 15 mol %, at least about 20 mol %, at least about 25 mol %, at least about 30 mol %, at least about 35 mol %, at least about 40 mol %, at least about 45 mol %, at least about 50 mol %, at least about 55 mol %, at least about 60 mol %, at least about 65 mol %, at least about 70 mol %, at least about 75 mol %, at least about 80 mol %, at least about 85 mol %, at least about 90 mol %, or at least about 95 mol %.

Suitable separators for use in the supercapacitor would be known to a skilled person, and would be provided in the form of an ion-permeable layer interposed between the electrodes. The function of such ion-permeable layer is that of providing electrical insulation between the electrodes while allowing ions to diffuse to and from each electrode. Accordingly, the separator may be made of any material that ensures (i) electric insulation and (ii) ion conduction between the electrodes. For example, the separator may be formed from a polymer material or ceramic-polymer composite, for example celgard membrane and glass-fiber. Those latter composite separators are advantageously in that they can provide for thermal stability while significantly reducing fire risk. Accordingly, example of suitable separators include layers made of nonwoven fibers (e.g., cotton, nylon, polyesters, and glass), and polymer films (e.g., polyethylene, polypropylene, poly such as tetrafluoroethylene, and polyvinyl chloride).

The supercapacitor described herein is capable of operating over a broad range of voltages. In some embodiments, the supercapacitor is capable of operating at a voltage of from about 0.01V to about 9V, from about 0.01V to about 4.5V, from about 0.01V to about 3V, or from about 0.01V to about 2.5V.

In addition, the supercapacitor can display remarkable energy and power density over conventional devices.

In some embodiments, the supercapacitor has an energy density of at least about 1 Wh/kg, at least about 10 Wh/kg, or at least about 50 Wh/kg. For example, the supercapacitor may have an energy density of from about 1 Wh/kg to about 400 Wh/kg, or of from about 1 Wh/kg to about 50 Wh/kg.

Also, the supercapacitor may have a power density of at least about 100 W/kg. In some embodiments, the supercapacitor has a power density of from about 100 W/kg to about 15,000 W/kg, from about 250 W/kg to about 15,000 W/kg, from about 500 W/kg to about 15,000 W/kg, from about 500 W/kg to about 10,000 W/kg, or from about 750 W/kg to about 10,000 W/kg. For example, the supercapacitor may have a power density of from about 1,500 W/kg to about 3,500 W/kg.

Specific embodiments of the invention will now be described with reference to the following non-limiting examples.

EXAMPLES

Example 1

Fabrication of prGO Suspension in Water

A graphene oxide (GO) suspension with concentration of ~20 g/lit was first fabricated by exfoliation of desalted graphite oxide (GtO) powders (as supplied by The Sixth Element Inc.) in water purified by reverse osmosis (RO water). Subsequently, an appropriate amount of potassium iodide (KI) was added to the suspended GO to achieve GO:KI weight ratios ranging from 1:2 to 4:1. The mixture was rigorously stirred at room temperature to achieve a uniform and stable liquid composition comprising prGO suspended in water.

The effect of addition of KI on the oxygen-containing functional groups of GO was explored by Fourier Transform Infrared spectroscopy (FTIR). For this purpose, aliquots of the suspensions with various GO:KI weight ratios were deposited by coating on a glass slide and dried in a vacuum oven to remove water. The FTIR spectra of the dried layers were then recorded using an attenuated total reflectance Fourier Transform Infrared spectrometer (ATR-FTIR) (PerkinElmer, USA) in the wavenumber range of 950-4000 $cm^{-1}$ at an average of 32 scans with a resolution of 2 $cm^{-1}$.

Example 2

FTIR Spectroscopy

As shown in FIG. 1, the FTIR spectra of a pristine GO film displays the presence of peaks associated to C—O, C—OH, C=C, C=O in carboxylic acid and carbonyl moieties. These are present mostly along sheet edges but also on the basal plane of graphene sheets, and a broad O—H peak. Interestingly, the peaks corresponding to C—O, C—O—H, and C=O functional groups were substantially reduced by increasing the amount of KI and almost fully disappeared when the GO:KI weight ratio reached 1:2. This indicates that simply combining suspended GO with dissolved KI in water can promote chemical reduction of GO, and the resulting suspension is predominantly composed of prGO.

Raman Spectroscopy

To further understand the interaction of KI with GO, Raman spectroscopy was performed. Raman spectra of dried layers obtained from the liquid composition of prGO and KI films upon removal of water were obtained using a Renishaw Confocal micro-Raman Spectrometer equipped with a HeNe (632.8 nm) laser operating at 10% power. Extended scans (10 s) were performed between 100 and 3200 wavenumbers with a laser spot size of 1 μm Once the background was removed the intensity of the spectra was normalized by dividing the data by the maximum intensity. Peak fitting was carried out using the PeakFit software package and the fitted curves were used to determine the intensity ratio ($I_D/I_G$) of the main G and D bands. The results are summarised in FIG. 2.

Each spectrum exhibited a G band around 1600 $cm^{-1}$, corresponding to the bond stretching of all pairs of $sp^2$ atoms in carbon rings and chains, which is a measure of graphitization of the GO structure, and a D band at ~1350 $cm^{-1}$, arising from the breathing modes of $sp^2$ atoms in carbon rings, which requires a defect/disorder for its activation. By combining KI and GO, the $I_D/I_G$ ratio (measured and averaged over at least 5 different areas of the samples) decreased from 1.21 to 1.13. The decrease in the ratio is attributed to the removal of functional groups and restoration of C=C bonds. These results are consistent with FTIR analysis suggesting KI-induced partial reduction of GO to prGO.

X-Ray Photoelectron Spectroscopy (XPS)

Figure 3:
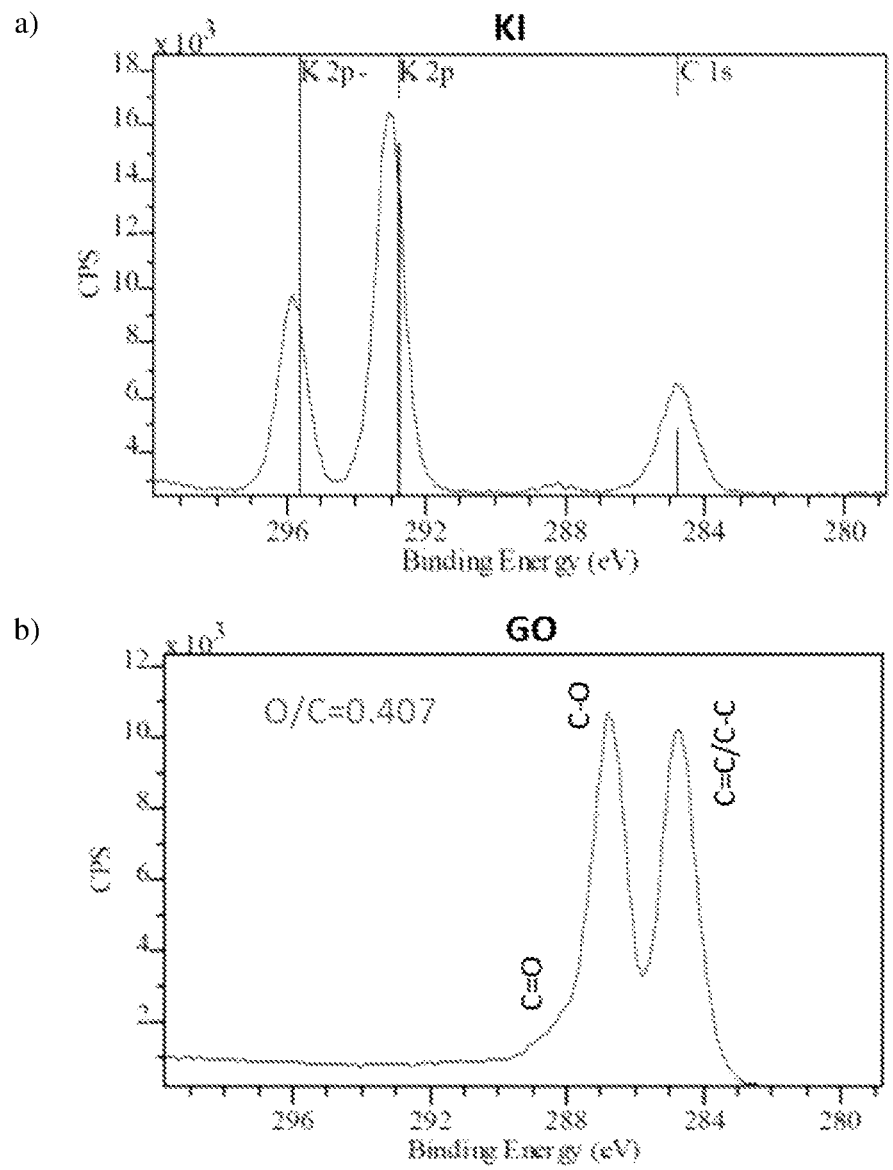
FIG. 3 shows high resolution C is X-ray Photoelectron Spectroscopy (XPS) spectra and corresponding O/C ratios of (a) KI powder and (b) dry GO.
Figure 4:
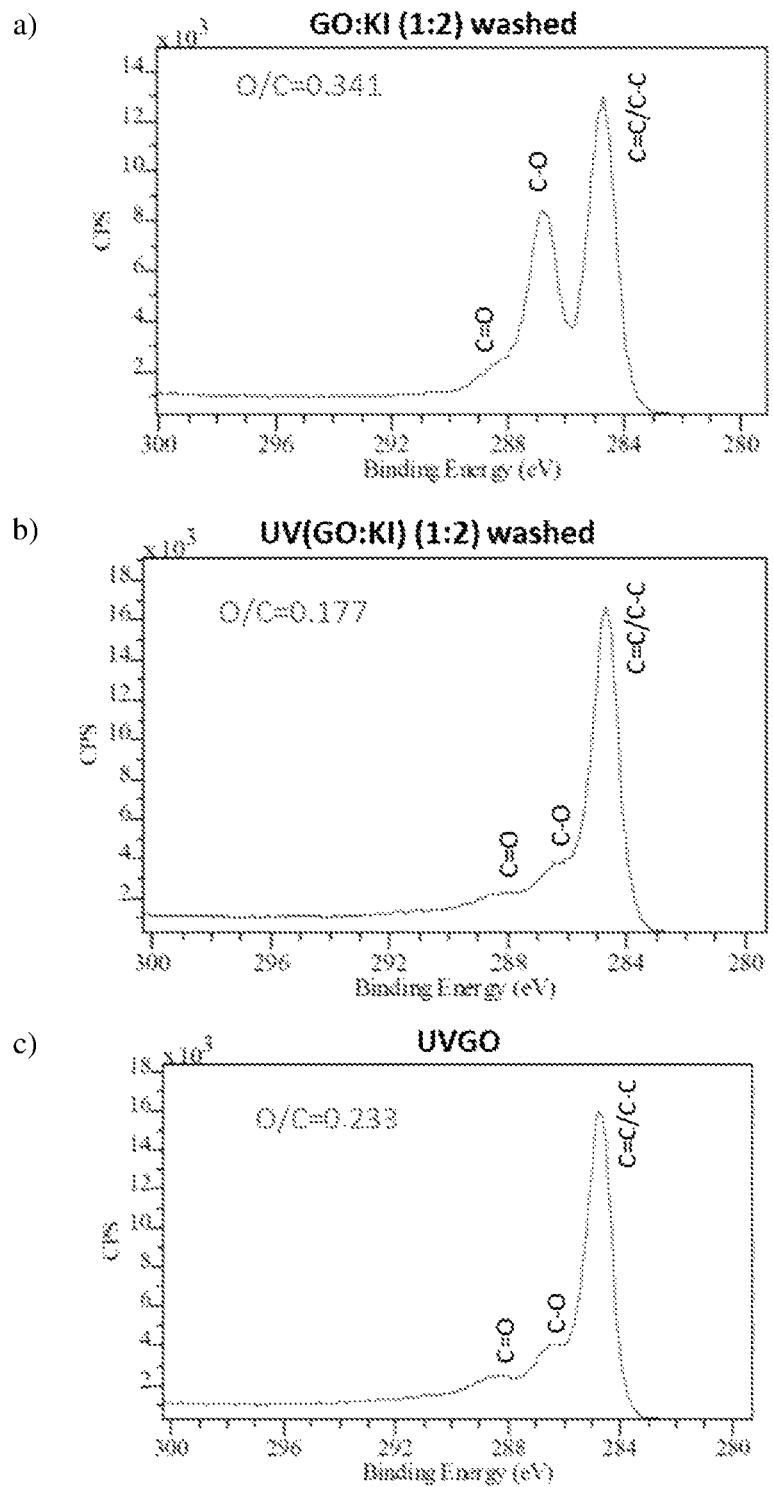
FIG. 4 shows high resolution C is X-ray Photoelectron Spectroscopy (XPS) spectra and corresponding O/C ratios of (a) GO:KI (1:2) graphitic layer, (b) a UV(GO:KI) (1:2) graphitic layer, and (c) a dry GO layer after irradiation with UV light (UV(GO))

XPS confirms the FTIR and Raman spectroscopy observations. O/C ratios of the samples were determined from the survey spectra. To isolate the signals of GO, prGO, and the reduced form of GO obtained upon UV irradiation, the KI-containing samples were substantially washed before the XPS analysis. FIGS. 3 and 4 show high-resolution C 1s spectra for each sample.

Because of the proximity of the peaks, the C 1s spectrum of KI also included the K 2p doublet. Removal of the duplet after washing indicates the effectiveness of the washing process and removal K ions. The O/C ratio of GO layers was 0.407 and its C 1s spectrum contained the peaks belonging to C=O, C—O and C—C/C=C groups as marked on the graph. It was found that simply combining dissolved KI with suspended GO reduces the O/C ratio to 0.341, indicating that this process is reducing GO by removing predominately C—O groups, like epoxy and hydroxyl.

X-Ray Diffraction (XRD)

Figure 5:
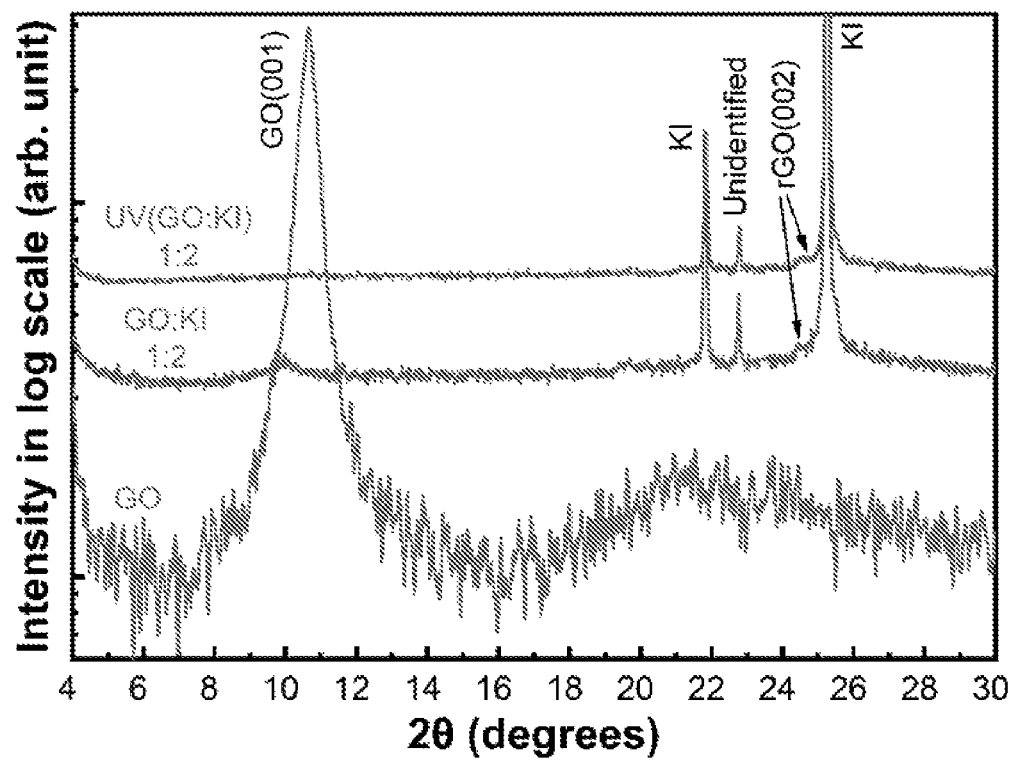
FIG. 5 shows X-Ray Diffraction (XRD) patterns of GO, a GO:KI (1:2) graphitic layer formed on a glass slide, and a corresponding graphitic layer after UV irradiation UV(GO:KI) (1:2)

KI induced reduction of GO was further confirmed using X-ray diffraction (XRD) analysis of the dried layers, using a Bruker D2 phaser diffractometer with Cu-Kα radiation generated at 30 kV and 10 mA at a scan rate of 2°/min and a step size of 0.02°. Pristine GO exhibits only one peak at 2θ of about 10.7° which is attributed to the (001) planes of GO (FIG. 5). The peak substantially suppressed in the GO:KI 1:2 sample and moved to slightly lower 2θ, probably due to intercalation of $K^+$ or $I^-$ ions between the (001) plans of GO and increase of the interlayer distance. Furthermore, a small hump appeared at about 24-25°, which is ascribed to the characteristic rGO (002) peak. The rest of the peaks were found to belong to unreacted KI crystals.

Electrical Sheet Resistance

Electrical sheet resistance measurements were performed using a 1 mm wide-spacing four-point probe operated by a Keithley electrometer (model 2400, USA). The characterisation revealed a considerable reduction of sheet resistance due to addition of KI. While dried GO layer had a sheet resistance of ~1.4 GΩ/□, that of the GO:KI (1:2) reduced to ~24.7 MΩ/□. To eliminate effect of residual KI in the measurements, the film was extensively washed with RO water and dried in a vacuum oven. The sheet resistance of the washed film was about 25.5 MΩ/□, very close to that of the un-washed film. These results are further evidence for formation of prGO and restoration of C=C bonds due to combination with KI.

Example 3

Polarized Light Microscopy Study of the Liquid Composition

The liquid composition comprising prGO and iodide shows the optical characteristics of a liquid crystal. To prove the liquid crustal nature of the suspension, polarized light microscopy was carried out using an inverted Leica DM IRB Microscope fitted with Abrio polarizing imaging system from CRI, Inc. Images were taken at birefringence set-up mode comprising a linear polarizer, an analyser and two variable electro-optical retarder plates instead of the traditional compensator. The polarized light transmitted through the specimen, loaded in a clean traditional microscopic glass slide, passed through an analyser, and finally captured in a sensitive CCD camera. The captured signals were successively processed using a digital image processing system to generate the optical retardance and slow axis orientation images of the anisotropic material. rGO suspension with GO:KI ratio of 1:2 was used for this purpose.

As found from the polarized light microscopy micrographs (not shown), the liquid composition comprising prGO and iodide exhibits optical retardance. The retardance is generated due to the in and out of plane optical phase difference, which is a characteristic of an anisotropic material. Further, the prGO platelets were oriented to a preferred direction, and that preferred direction spatially changed throughout the sample, forming a typical nematic liquid crystal domain. The analysis shows the liquid crystal nature of the liquid composition.

Example 4

Stability of the Liquid Composition

While GO makes a highly stable suspension in water, it is challenging to obtain stable aqueous prGO suspensions. Hence, it is important to examine the stability of the liquid composition comprising prGO. As a measure of stability, zeta potentials of the liquid composition were measured using a Brookhaven Nanobrook Omni Zeta Potential Analyzer. Average value from 5 measurements of each sample, wherein each measurement consisting of 20 phase cycles at 25° C. was taken. For the measurement, a palladium electrode was immersed in a polystyrene cuvette such that bubbles do not form. With 1.0 cm path length of polystyrene cuvette, Zeta potential, $\zeta$ was determined using the Smoluchowski approximation:

$$u_E = \frac{\vartheta_E}{E} = \frac{\zeta \varepsilon}{\eta}$$

where, $u_E$ is the electrophoretic mobility, $\vartheta_E$ is the electrophoretic velocity, E is the electric field strength, $\varepsilon$ is the permittivity and $\eta$ is the viscosity of the medium.

Figure 6:
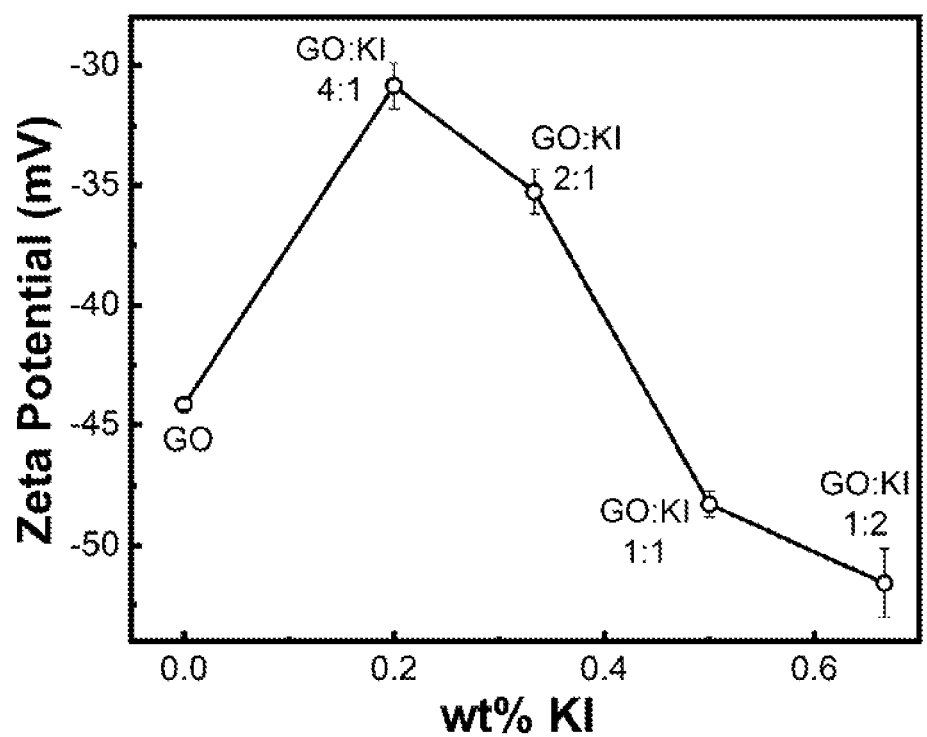
FIG. 6 shows Zeta potential values of a water suspension of GO and suspensions of partially reduced GO obtained by combining GO and KI in water according to GO:KI weight ratios of 4:1, 2:1, 1:1, and 1:2.

By addition of KI into GO, the zeta potential initially increased (FIG. 6). This may be attributed to formation of some prGO, which initially reduces stability of the suspension. With further increase of KI amount, the zeta potential started to decrease and dropped to below that of pure GO suspension, a sign of improved stability. With adding more KI and further removal of functional groups, the high electrostatic negative charges may be screened by the net positive charges due to the presence of $K^+$ ions. On the other hand, the electrostatic repulsion due to $I^-$ ions could assist in effective dispersion of prGO in the aqueous phase resulting in reduction of the zeta potential and increase in stability of the suspension.

Stability of the suspensions was further physically evaluated through a prolonged storage. A prGO liquid composition with GO:KI weight ratio of 1:2 was diluted to different extents to achieve concentrations ranging from 10-2 g/lit by adding appropriate amounts of RO water. The suspensions were stable up to 4 months showing no visible settlement of floating of prGO.

Example 5

UV Irradiation

To further reduce the prGO (GO:KI 1:2) layers, the dried coatings were exposed to 254 nm UV light using a UV lamp (55 W, Philips, TUV PL-L 55W/4P) with intensity of 22.4 mW/cm² for 17 h. During the exposure, samples were placed at a distance of 5 cm away from the UV lamp.

Figure 2:
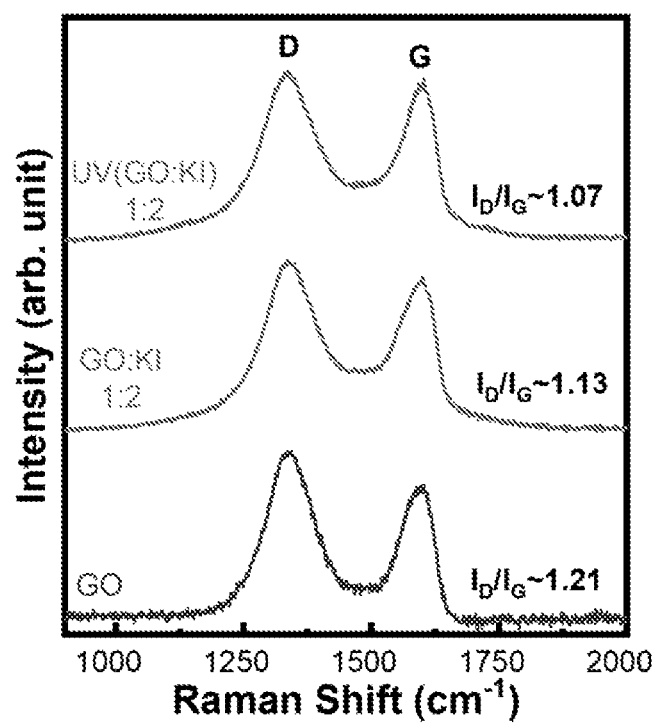
FIG. 2 shows Raman spectra and corresponding $I_D/I_G$ ratios of (i) dry GO, (ii) a partially reduced GO/KI graphitic layer obtained by drop-casting on a glass slide a 1:2 (by weight) water suspension of partially reduced GO and KI followed by drying, identified as GO:KI (1:2), and (iii) the resulting layer of reduced GO obtained after UV irradiation, identified as UV(GO:KI) (1:2)
Figure 7:
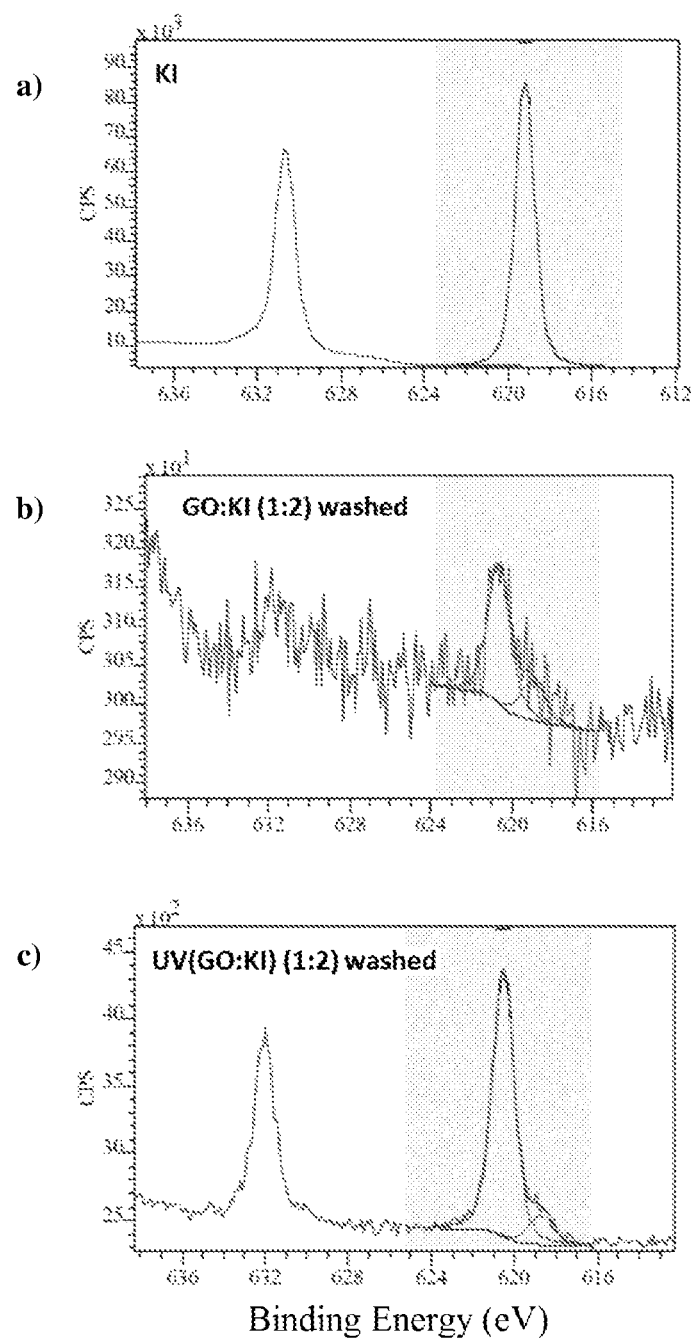
FIG. 7 shows high resolution I 3d XPS spectra of KI powder, a GO:KI (1:2) graphitic layer, and a UV(GO:KI) (1:2) graphitic layer.

After reduction by UV exposure, the GO peak in XRD patterns completely disappeared (FIG. 5), and characteristic $I_D/I_G$ ratio of Raman spectra further reduced to 1.07 (FIG. 2). In addition, the XPS analysis confirmed the UV reduction of GO by removal of C—O groups and reduction of the O/C ratio to 0.177 (FIG. 4(b)). It is worth noting that XPS analysis revealed a larger O/C ratio (0.233) for the pure GO film reduced by UVC light (FIG. 4(c)). These results indicate that addition of KI to GO resulted in partial reduction of GO and improved reduction efficiency of UV irradiation. Furthermore, the high resolution I 3d XPS scans of the samples (FIG. 7) indicate that I forms a bond with prGO, especially during UV reduction, forming I-doped prGO. In FIG. 7a, the full-width at half-maximum (FWHM) of the peak on the right is 1.0983 eV. In FIG. 7b, the peak on the right can be deconvoluted to two peaks having FWHM of 1.3262 (77.03% area) and 1.4 (22.97% area). In FIG. 7c, the peak on the right can be deconvoluted to two peaks having FWHM of 1.2408 (89.04% area) and 1.3861 (10.96% area). The x-axis for FIGS. 7a, 7b, and 7c is Binding Energy (eV).

In addition, the sheet resistance of the UV treated rGO film significantly reduced by a factor of about 22, from ~24.7 MΩ/☐ to ~1.1 MΩ/☐.

Example 6

Supercapacitor Fabrication

Double layer supercapacitor devices were constructed using the form of reduced GO obtained with the procedure described in the Examples above. First form of reduced GO was rod coated on metallic current collectors to fabricate electrodes. The areal loading of the fabricated electrodes, measured using a micro-balance with weighting accuracy of 10 µg, was about 7 mg/cm² which translates to graphitic areal loading of 2.3 mg/cm². The electrodes were then further reduced by UV exposure for 17 h and packaged in a typical pouch cell configuration, consisting a pair of folded electrodes separated by a separator soaked in $Li_2SO_4$ electrolyte at ambient condition.

Figure 8:
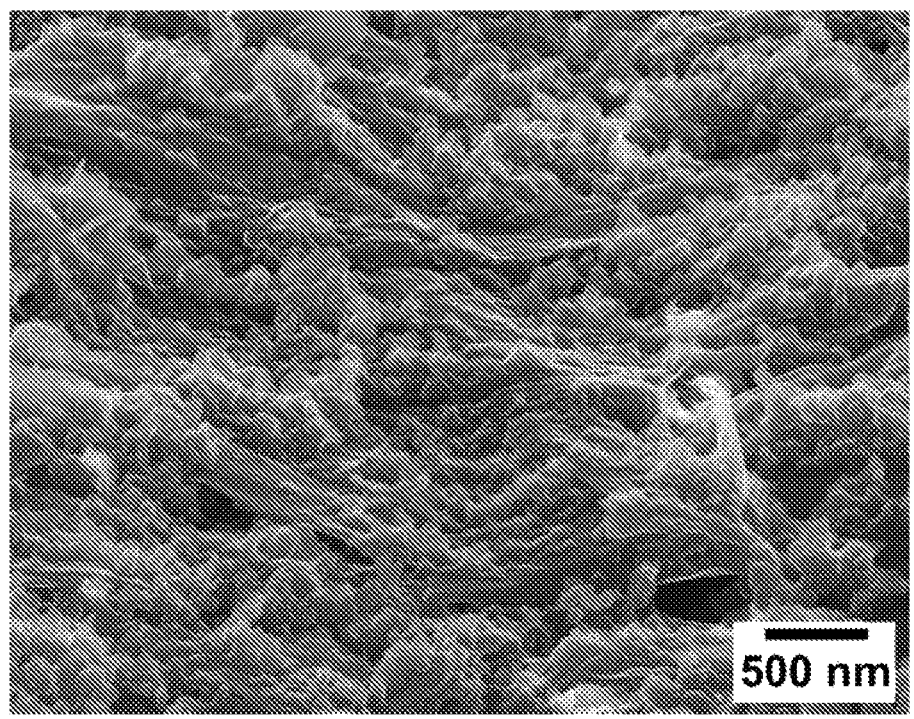
FIG. 8 shows a scanning-electron microscope (SEM) micrograph of the cross section of an electrode obtained by forming a UV(GO:KI) (1:2) graphitic layer on a metallic current collector.

Scanning electron microscopy (SEM, FEI Nova Nano-SEM 450 FEG) was used to examine morphology of the electrodes and distribution of the residual KI crystals within rGO. It is obvious from the cross section SEM micrographs that the KI crystals (round particles) were distributed between the graphitic layers of rGO forming a lasagne-type structure (FIG. 8). Such a distribution of iodide between the graphitic sheets is expected to greatly reduce the resistance of the electrode and enhance its rating capability.

Example 7

Figure 9:
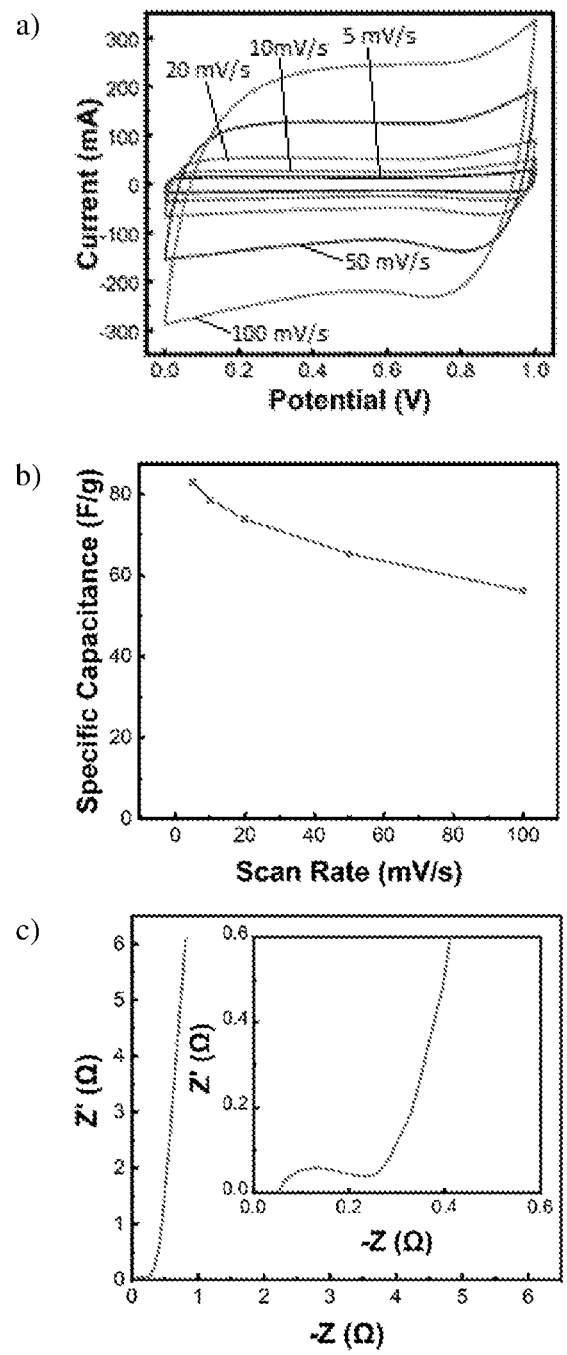
FIG. 9 shows (a) cyclic voltammograms of a supercapacitor having UV(GO:KI) (1:2) electrodes, measured at different scan rates, (b) scan rate dependency of the specific capacitance of the UV(GO:KI) (1:2) electrodes, and (c) Nyquist diagram showing the electrical impedance behaviour of the electrodes.

Performance of the supercapacitor device was evaluated by a BioLogic Potentiostat. Open circuit potential (OCP) was monitored for at least 1 h to confirm its stability with time. A fluctuation of OCP within 10 mV for a period of 1000 s was considered as a stable potential before carrying out the electrochemical measurements. Cyclic voltammograms (CV curves) of the electrode were recorded over the test potential window at various scan rates (5 mV/s to 100 mV/s). The measurement was repeated for 50 cycles for each scan rate. The CV voltammograms of the supercapacitor device at different scan rates are shown in FIG. 9.

The voltammograms were rectangular up to scan rate of 100 mV/s, which signifies the typical double-layer capacitive behaviour of the electrodes and their excellent rating capability (FIG. 9(a)). The specific capacitance of these electrodes at 5 mV/s was about 83 F/g. FIG. 9(b) summarises the scan rate dependent specific capacitance of the electrodes. The electrodes exhibited good capacitance retention with increase of scan rate with a capacitance retention of about 70%. Furthermore, the electrodes exhibited a high energy density of 11.5 Wh/kg and large power density of 2800 W/kg in the pouch cell configuration.

Electrochemical impedance spectroscopy (EIS) tests were carried out by applying a sinusoidal potential perturbation at the open circuit potential with an amplitude of 10 mV. The impedance response was measured over frequencies between 1 MHz and 10 mHz, recording 6 points per decade of frequency. All the electrochemical experiments were repeated at least three times to examine the reproducibility of the electrochemical data. FIG. 9(c) shows the Nyquist plot of the electrode, the plot consisted of a high frequency small semicircle and a high slope straight line in the low frequency region. The small high frequency semicircle represents a very small charge transfer resistance and the low frequency high slope straight line represents the capacitive nature of the electrodes. The resistance of the electrodes, estimated from the intersection of the Nyquist plot with real part of impedance (x axis), was found to be very low and about 60 mΩ.

Figure 10:
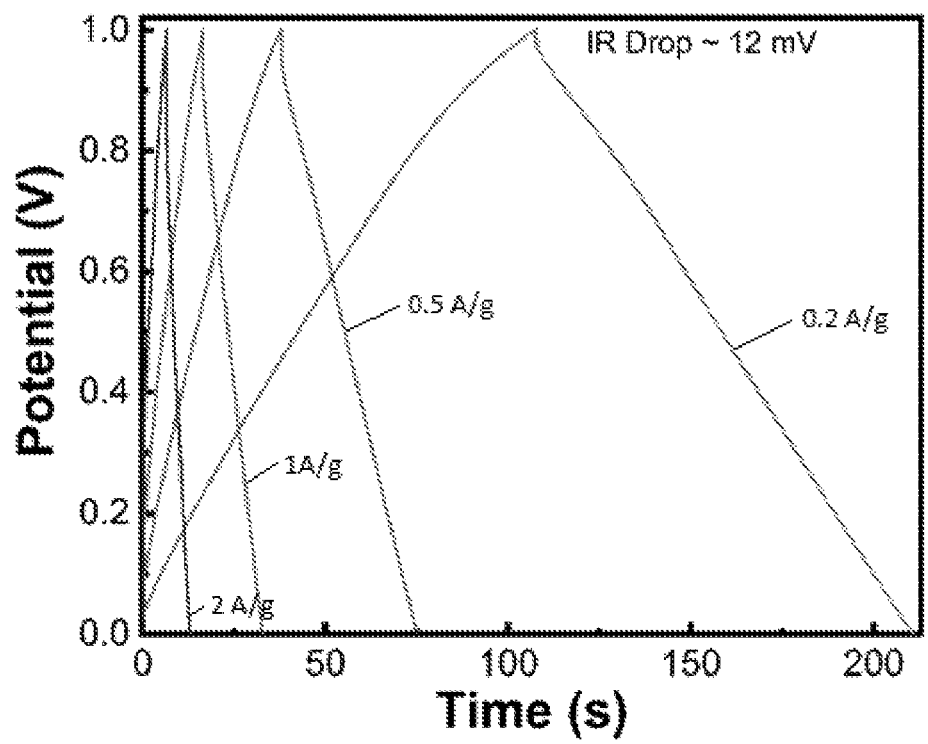
FIG. 10 shows Galvanostatic charge-discharge curves of the supercapacitor having UV(GO:KI) (1:2) electrodes, measured at different current densities.

Galvanostatic charge/discharge curves of the electrode measured at various current densities (0.2 A/g, 0.5 A/g, 1 A/g and 2 A/g) are shown in FIG. 10. Symmetric and linear charge-discharge profile with a constant slope over the whole potential range was obtained for all of the current densities, resembling a nearly perfect double layer capacitive behaviour. Furthermore, a very small IR drop was observed in the charge-discharge curves resembling a small equivalent series resistance (ESR) of the devices (about 400 mΩ), in agreement with impedance measurements (~300 me, estimated from the intersection of the tangent of the low frequency region of the Nyquist plot with real part of impedance (x axis)).

Example 8

Figure 11:
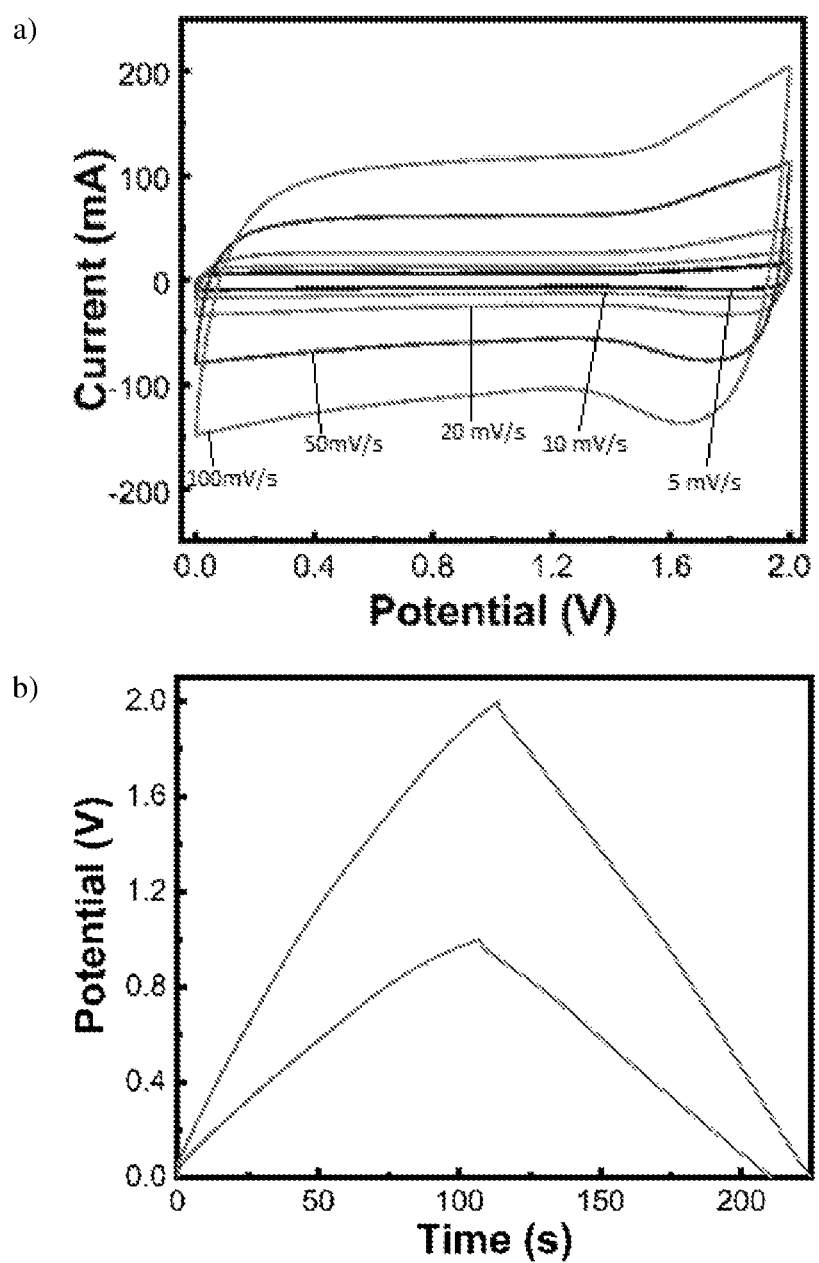
FIG. 11 shows (a) cyclic voltammograms of a 2V supercapacitor having UV(GO:KI) (1:2) electrodes, and (b) galvanostatic charge-discharge curves of the 2V supercapacitor and its comparison with a corresponding 1V supercapacitor measured at a 28.8 mA current.

1V and 2V supercapacitor devices were fabricated, the latter obtained by connecting two 1V devices in series. FIG. 11 summarises the CV curves as well as charge-discharge behaviour of the 2 V device and its comparison with that of 1V supercapacitor measured at the same current of 28.8 mA. The 2V supercapacitor exhibited similar characteristics to the 1V supercapacitor, i.e. rectangular CV curves and symmetric and linear charge-discharge profile.

Throughout this specification and the claims which follow, unless the context requires otherwise, the word 'comprise', and variations such as 'comprises' and 'comprising', will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A method of reducing graphene oxide (GO), the method comprising the steps of:
   suspending GO and dissolving an iodide in a liquid medium, whereby the dissolved iodide partially reduces the GO to obtain a liquid composition comprising partially reduced GO (prGO) and dissolved iodide,
   removing liquid medium from the liquid composition to form a graphitic layer comprising prGO and iodide, and
   irradiating the graphitic layer with UV radiation to further reduce the prGO and provide for a reduced form of graphene oxide.

2. The method of claim 1, wherein the GO and the iodide are provided in the liquid medium according to a GO: iodide weight ratio from about 1:2 to about 4:1.

3. The method of claim 1, wherein the GO is suspended in the liquid medium according to a concentration of from about 0.1 g/l to about 500 g/l.

4. The method of claim 1, wherein the liquid medium comprises water.

5. The method of claim 1, comprising a step of depositing the liquid composition on a substrate prior to removing liquid medium from the liquid composition.

6. The method of claim 5, wherein depositing the liquid composition on a substrate comprises drop casting, spin-coating, dip-coating, spray coating, ink-jet printing, gravure printing, screen printing, rod coating, tape casting, or slot die casting the liquid composition on a surface of the substrate.

7. The method of claim 5, wherein the substrate is selected from a polymer substrate, a ceramic substrate, and a metal substrate.

8. The method of claim 5, wherein the substrate is a current collector for an electrode.

9. The method of claim 1, wherein the UV radiation has a wavelength in the UVC range.

10. The method of claim 9, wherein the UV radiation is monochromatic UV radiation.

11. The method of claim 10, wherein the monochromatic UV radiation has a wavelength of about 254 nm.

12. The method of claim 1, wherein the UV radiation has an intensity of from about 1 to about 100 mW/cm2.

13. The method of claim 1, wherein the graphitic layer comprising prGO and iodide is irradiated for about 10 minutes to about 24 hours.

14. The method of claim 1, wherein the iodide is an alkali metal iodide selected from lithium iodide, potassium iodide, sodium iodide, and a combination thereof.

15. A graphitic material comprising stacked sheets of a reduced form of graphene oxide intercalated with iodide, wherein the stacked sheets have a packing density from 0.05 to 10 g/cm$^3$.

16. An electrode comprising the graphitic material of claim 15.

17. A supercapacitor comprising an electrode as defined in claim 16.

18. The supercapacitor of claim 17, having an electrolyte comprising a salt selected from a lithium salt, a sodium salt, a potassium salt, and a combination thereof.

* * * * *